United States Patent
Heidemann et al.

(10) Patent No.: US 11,859,448 B1
(45) Date of Patent: Jan. 2, 2024

(54) RIG MOVEMENT, ROTATION AND ALIGNMENT ASSEMBLY

(71) Applicant: Woolslayer Companies, Inc., Tulsa, OK (US)

(72) Inventors: Shelby Heidemann, Chappell Hill, TX (US); Thomas McGuire, Claremore, OK (US)

(73) Assignee: Woolslayer Companies, Inc., Tulsa, OK (US)

( * ) Notice: Subject to any disclaimer, the term of this patent is extended or adjusted under 35 U.S.C. 154(b) by 819 days.

(21) Appl. No.: 16/926,998

(22) Filed: Jul. 13, 2020

Related U.S. Application Data

(60) Provisional application No. 62/878,557, filed on Jul. 25, 2019.

(51) Int. Cl.
| | |
|---|---|
| *B66F 3/46* | (2006.01) |
| *E21B 15/00* | (2006.01) |
| *B66F 3/24* | (2006.01) |
| *B62D 5/02* | (2006.01) |

(52) U.S. Cl.
CPC .............. *E21B 15/003* (2013.01); *B62D 5/02* (2013.01); *B66F 3/24* (2013.01); *B66F 3/46* (2013.01)

(58) Field of Classification Search
CPC ......... E21B 15/003; B62D 57/02; B66F 3/24; B66F 3/46
See application file for complete search history.

(56) References Cited

U.S. PATENT DOCUMENTS

| | | |
|---|---|---|
| 5,921,336 A | 7/1999 | Reed |
| 6,581,525 B2 | 6/2003 | Smith |
| 7,681,674 B1 | 3/2010 | Barnes et al. |
| 7,819,209 B1 | 10/2010 | Bezner |
| 8,051,930 B1 | 11/2011 | Barnes et al. |
| 9,045,178 B2 | 6/2015 | Smith et al. |
| 9,168,962 B2 | 10/2015 | Trevithick et al. |
| 9,415,819 B2 | 8/2016 | Vogt |
| 10,202,156 B2 | 2/2019 | Higginbotham, III |
| 2014/0262562 A1 | 9/2014 | Eldib et al. |
| 2015/0122558 A1* | 5/2015 | Van Raden ........... E21B 15/003 180/8.1 |
| 2016/0280524 A1* | 9/2016 | Crisp ...................... B62D 5/28 |
| 2017/0036716 A1 | 2/2017 | Van Raden |

FOREIGN PATENT DOCUMENTS

WO 2017192359 11/2017

* cited by examiner

*Primary Examiner* — Nirvana Deonauth
(74) *Attorney, Agent, or Firm* — Head, Johnson, Kachigian & Wilkinson, PC

(57) ABSTRACT

A rig movement, rotation and alignment assembly. A plurality of lifting jack assemblies are provided, each of the lifting jack assemblies attached to a rig substructure. Each of the lifting jack assemblies has a cylinder housing and a rod movable axially within the cylinder housing. Each rod is engaged with a screw drive in order to rotate the rod with respect to the cylinder housing. Each rod includes a circumferential recess wherein the circumferential recess includes at least one flat segment. A retainer plate attached to each bearing pad is received in and engaged with the circumferential recess and with the flat segment, so that rotation of the rod results in rotation of the bearing pad.

10 Claims, 18 Drawing Sheets

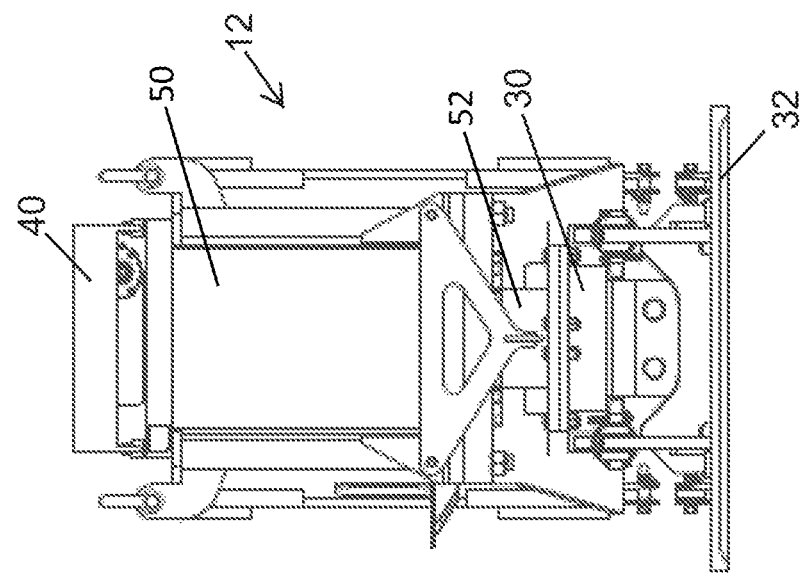
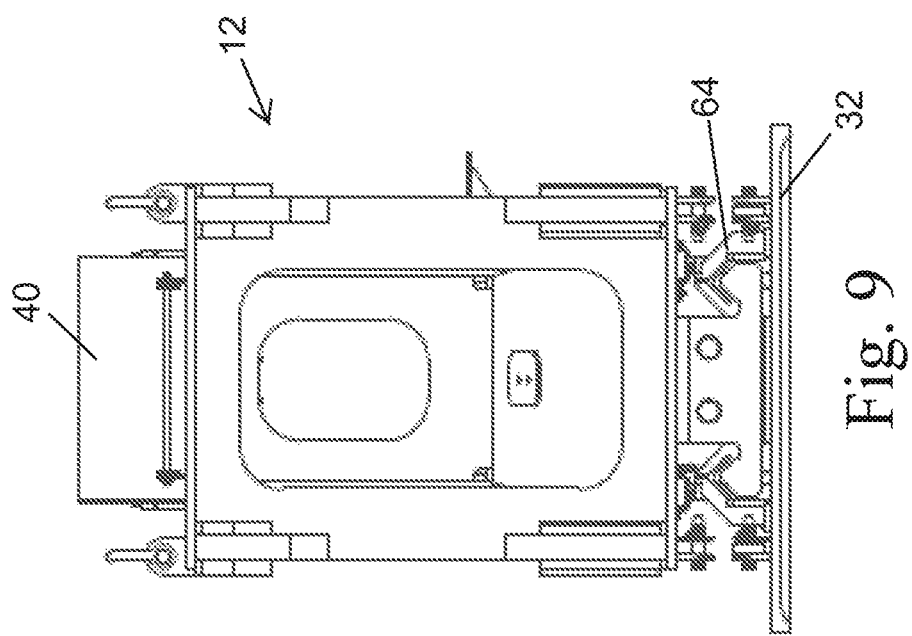

RIG MOVEMENT, ROTATION AND ALIGNMENT ASSEMBLY

1. CROSS-REFERENCE TO RELATED APPLICATIONS

This application is based on and claims priority to U.S. Provisional Patent Application Ser. No. 62/878,557, filed Jul. 25, 2019, which is incorporated herein in its entirety by reference.

BACKGROUND OF THE INVENTION

2. Field of the Invention

The present invention is directed to a rig movement, rotation and alignment assembly having a plurality of lifting jack assemblies for moving heavy equipment wherein each of said lifting jack assemblies may be moved, rotated and aligned separate and independent of the other lifting jack assemblies.

3. Description of the Related Art

It is sometimes desirable to move a drilling rig from one location to a nearby location. For example, it is sometimes desirable to move the rig to a nearby location to utilize an alternate wellbore. Traditionally, a drilling rig and all of its equipment is brought to a well site and assembled in a "rig-up" procedure. After the drilling or other operation is completed, the entire drilling rig and all of its equipment is disassembled in a "rig-down" procedure and then moved to a subsequent location to begin the process again.

A number of systems in the past have been utilized to move an entire drilling rig structure without disassembling. One type of system in the past included somewhat primitive rollers and skids that attempted to slide the entire drilling structure.

Applicant's U.S. Pat. No. 9,415,819 titled Rig Movement and Rotation Assembly illustrates an incremental movement system with links between pairs of lifting jacks in order to steer or directionally position the rig as desired.

Van Raden (U.S. Pat. Publ. No. 2017/0036716) discloses multiple lifting jack assemblies for a walking machine. Each jacking assembly includes a hydraulic cylinder for providing steering. The lift cylinder is rotated about its vertical axis by a slew drive whereby a linkage assembly imparts rotation to an associated foot plate and roller assembly.

Trevithicks et al. (U.S. Pat. No. 9,168,962) discloses a drill rig relocation system having rotatable bearing mats.

Notwithstanding the foregoing, there remains a need to provide a system for incrementally moving heavy equipment in any desired direction wherein the steering or directional positioning may be independently controlled without manual intervention.

There also remains a need to provide a system for incrementally moving heavy equipment wherein rods of hydraulic lift cylinders may be rotationally positioned without rotational movement of the hydraulic lift cylinders and wherein rotation of the rods directly rotates bearing pads.

SUMMARY OF THE INVENTION

The present invention is directed to a rig movement, rotation and alignment assembly having independent vertical lifting jack assemblies capable of operating independently of each other. Each vertical lifting jack assembly is connected to a rig substructure, which supports various equipment, a drilling floor and a mast.

Each lifting jack assembly includes a hydraulic cylinder housing and an elongated extendible and retractable rod movable axially within the cylinder housing. The rod of each lifting jack assembly is configured to move axially between an extended and retracted position.

Each of the lifting jack assemblies is detachably connected at an upper end to a rig substructure by a pod bracket.

Each rod of each lifting jack assembly is attached at its lower end to a bearing pad.

A screw drive in the form of a slew drive rotates the elongated rod with respect to the cylinder housing so that the cylinder housing remains stationary and attached to the pod bracket while the rod rotates.

The lower end of each rod terminates in a convex end which engages with and is retained in a mating top of a roller assembly which, in turn, is connected to a bearing pad.

Near a lower end of each elongated rod is a circumferential recess. The circumferential recess includes at least one flat segment. In a preferred embodiment, the circumferential recess includes a pair of opposed flat segments. A retainer plate comprising a pair of arcuate retainer plates together surround the elongated rod and reside in the circumferential recess. The arcuate retainer plates also have flat segments which mate with the flat segments in the circumferential recess of the elongated rod. Accordingly, the retainer plates trap the elongated rod. The retainer plates are, in turn, secured to the roller assembly which, in turn, is secured to the bearing pad.

The elongated rod is, thus, connected to the bearing pad through the roller assembly. Accordingly, rotational movement of the rod results in rotational movement of the roller assembly and, in turn, the bearing pad.

BRIEF DESCRIPTION OF THE DRAWINGS

FIG. 9 illustrates a rear view and

FIG. 10 illustrates a front view of the hydraulic cylinder housing and elongated rod along with a pod bracket and a bearing pad shown in FIGS. 4 and 5;

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
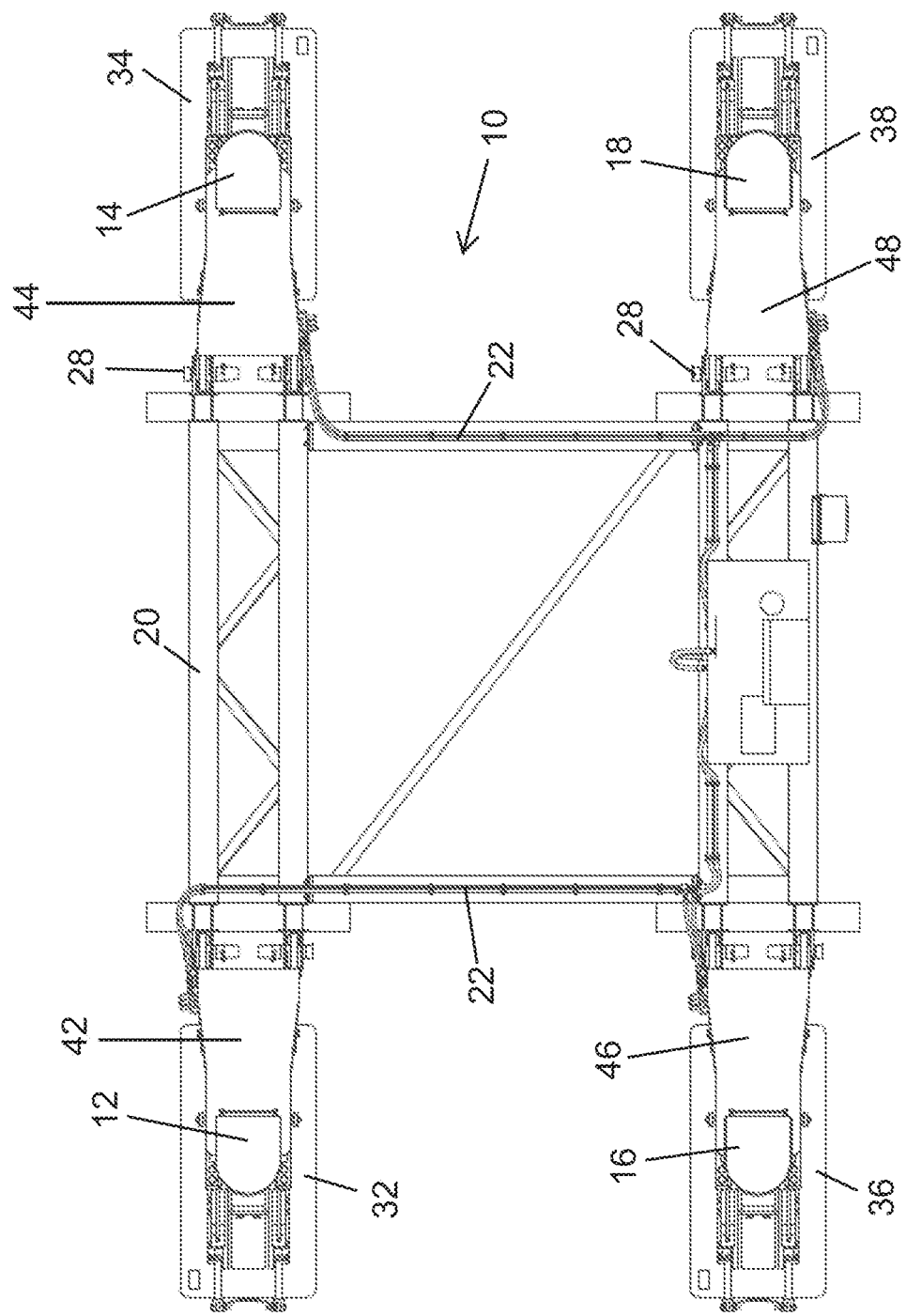
FIG. 1 illustrates a top view.
Figure 2:
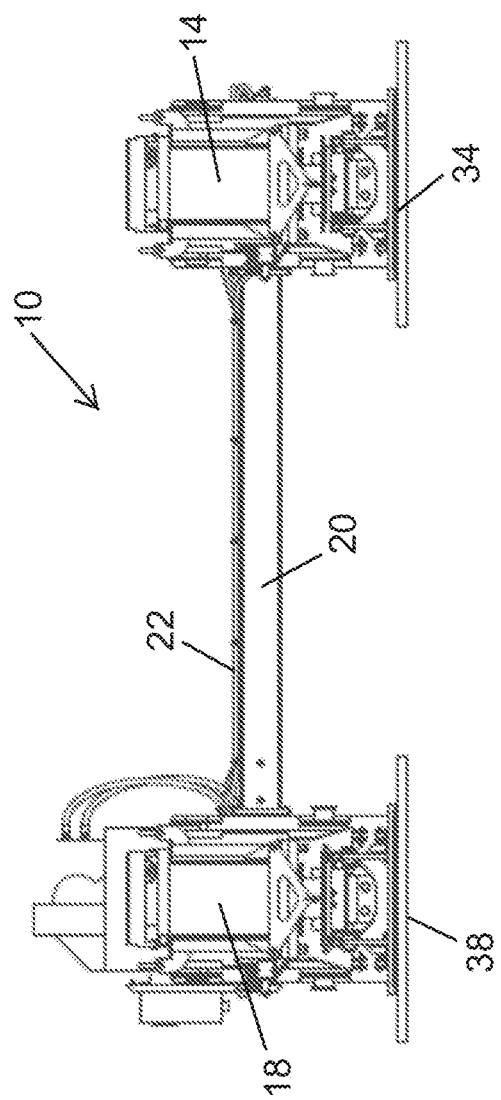
FIG. 2 illustrates an end view.
Figure 3:
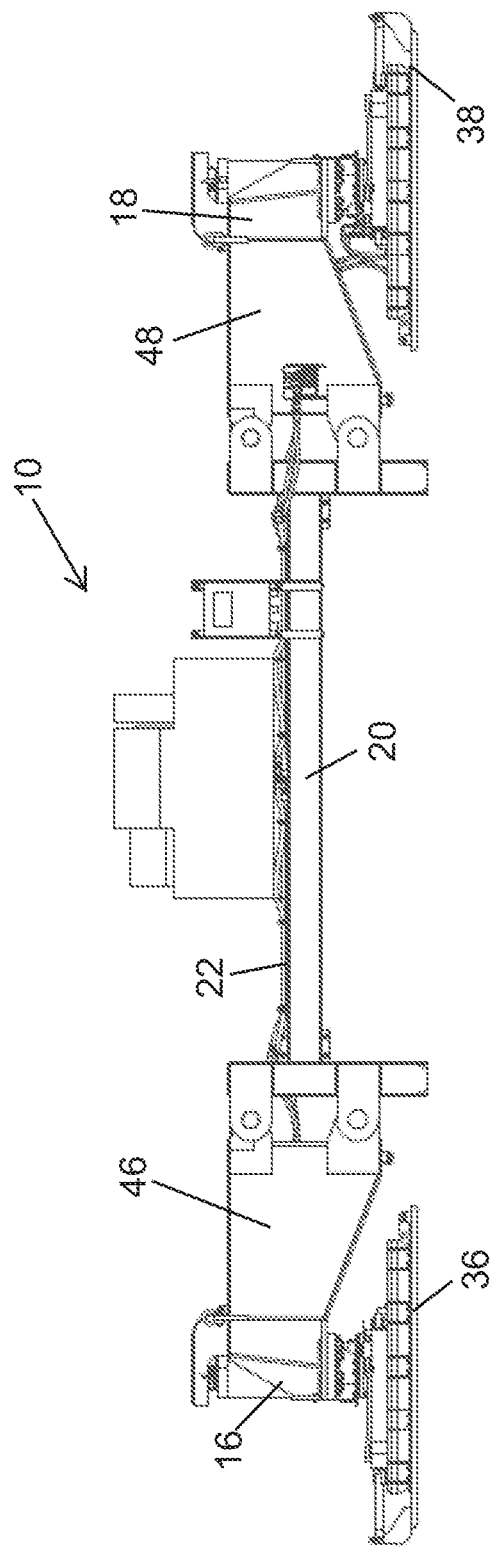
FIG. 3 illustrates a side view of a rig movement, rotation and alignment assembly constructed in accordance with the present invention.

Referring to the drawings in detail, FIG. 1 illustrates a top view, FIG. 2 illustrates an end view, and FIG. 3 illustrates a side view of a rig movement, rotation and alignment assembly 10 constructed in accordance with the present invention.

In a preferred embodiment, the assembly 10 includes four independent vertical lifting jack assemblies 12, 14, 16 and 18 which are capable of operating independently of each other. The lifting jack assemblies are spaced from and parallel to each other. In a preferred embodiment, four lifting jack assemblies are employed, however, it will be understood that a greater or lesser number might be employed within the spirit of the invention.

Each of the lifting jack assemblies 12, 14, 16 and 18 is connected to a rig substructure 20. The rig substructure 20 supports various equipment, a drilling floor, and a mast (not shown). The lifting jack assemblies 12, 14, 16 and 18 are connected to the hydraulic system of the rig by hydraulic lines 22. The hydraulic system provides motive force to the lifting jack assemblies. Each of the lifting jack assemblies is operated independently by the hydraulic system of the rig.

As will be described herein, each of the vertical lifting jack assemblies 12, 14, 16 and 18 includes a hydraulic cylinder housing 50 and an elongated extendible and retractable rod 52 movable axially within the cylinder housing.

Figure 4:
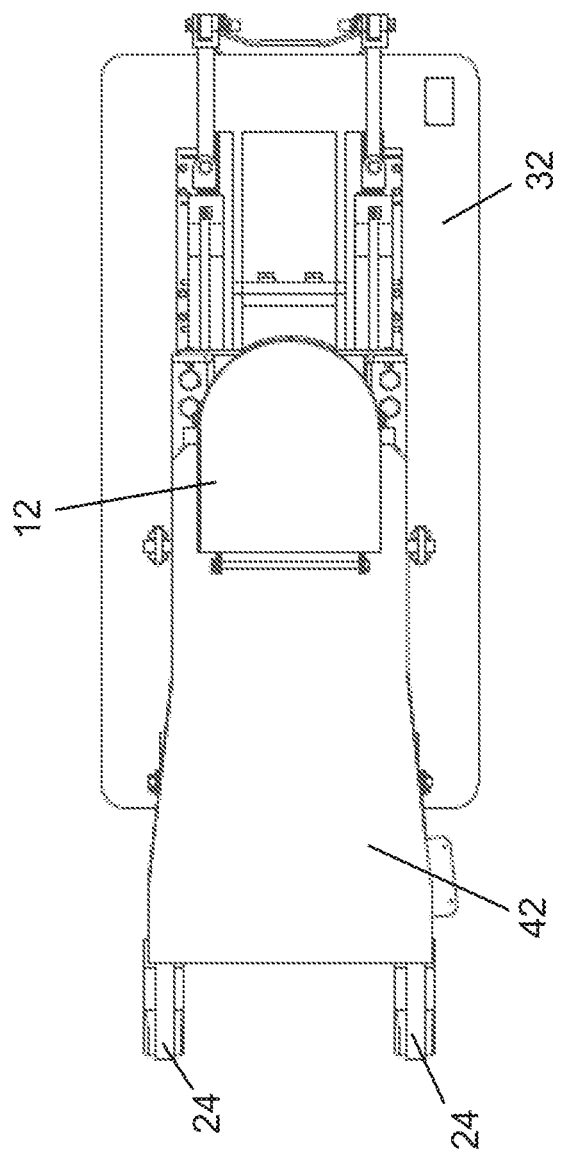
FIG. 4 illustrates a top view.
Figure 5:
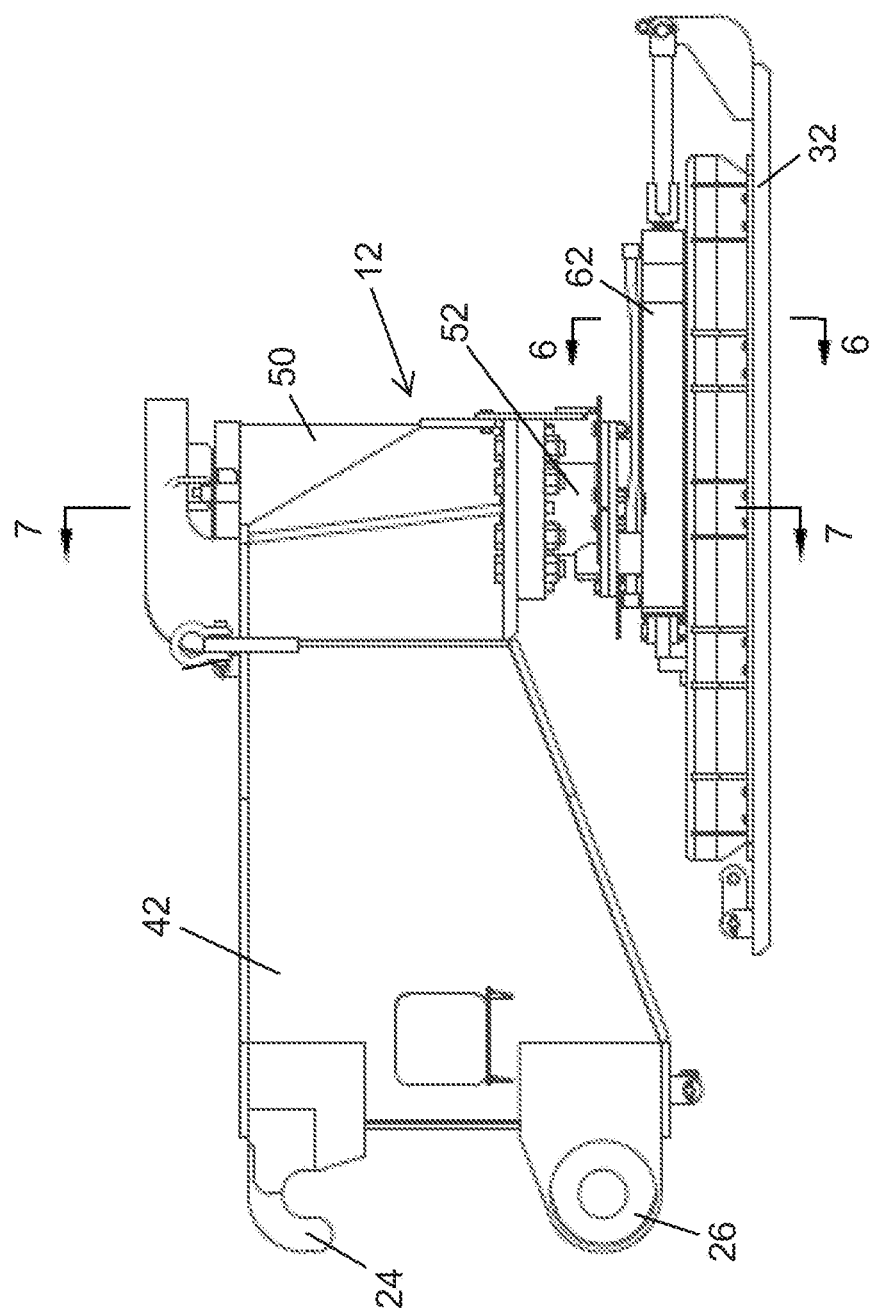
FIG. 5 illustrates a side view of one lifting jack assembly having a hydraulic cylinder housing and elongated rod apart from the assembly shown in FIGS. 1, 2 and 3.

FIG. 4 illustrates a top view, FIG. 5 illustrates a side view, FIG. 9 illustrates a rear view and FIG. 10 illustrates a front view of the hydraulic cylinder housing 50 and elongated rod 52. The drawings illustrate and the specification describes one lifting jack assembly 12, however, the others are configured in a similar manner.

The rod 52 of each lifting jack assembly moves between an extended and a retracted position. Each rod 52 is attached at its lower end to a bearing pad as will be described in detail. When the rod 52 of the lifting jack assembly is extended, the bearing pad rests on the ground.

Each of the lifting jack assembles 12, 14, 16 and 18 is also detachably connected near an upper end to the rig substructure 20 by a pod bracket 42, 44, 46 and 48, respectively. The rig substructure 20 supports a drilling rig (not shown). When the rod 52 of the lifting jack assembly is retracted, the substructure 20 rests on the ground and the bearing pads are spaced from the ground.

Each pod bracket 42, 44, 46 and 48 detachably connects to the substructure 20 with a pair of extending hooks 24 and a pair of eyes 26. The eyes 26 are configured to receive pins 28 which pass through openings in the substructure 20 in order to securely attach the pod bracket and the lifting jack assembly. Each lifting jack assembly, such as assembly 12, includes a cylinder housing 50 and an elongated rod 52 concentric with the cylinder housing and movable axially therein.

Figure 7:
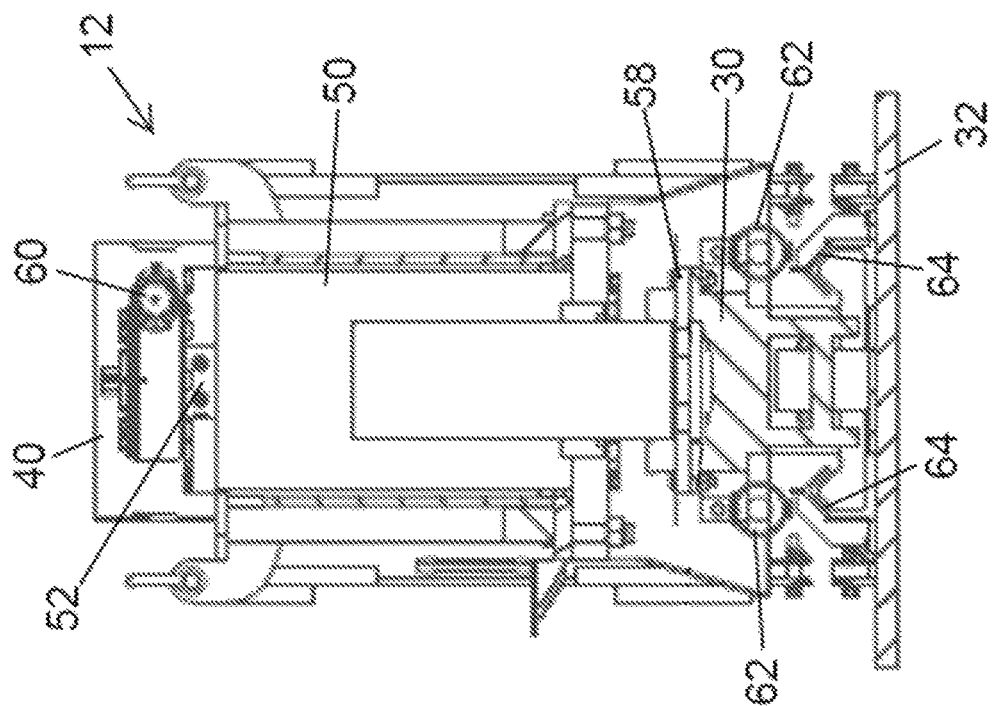
FIG. 7 illustrates a sectional view taken along section line 7-7 of FIG. 5.

FIG. 7 illustrates a sectional view taken along section line 7-7 of FIG. 5 showing the elongated rod 52 within the lifting cylinder housing 50.

Each lifting jack assembly includes a rod rotation drive assembly. As seen in FIG. 7, a screw drive in the form of a slew drive 60 rotates the elongated rod 52 with respect to the lifting cylinder housing 50. Stated in other words, the cylinder housing 50 remains stationary and attached to the pod bracket while the rod 52 rotates.

The lower end of each elongated rod 52 terminates in a convex end which engages with and is retained in a mating top of a roller assembly 30. Each roller assembly 30 includes a roller or a plurality of rollers which engage a flat surface on a roller track.

Figure 11:
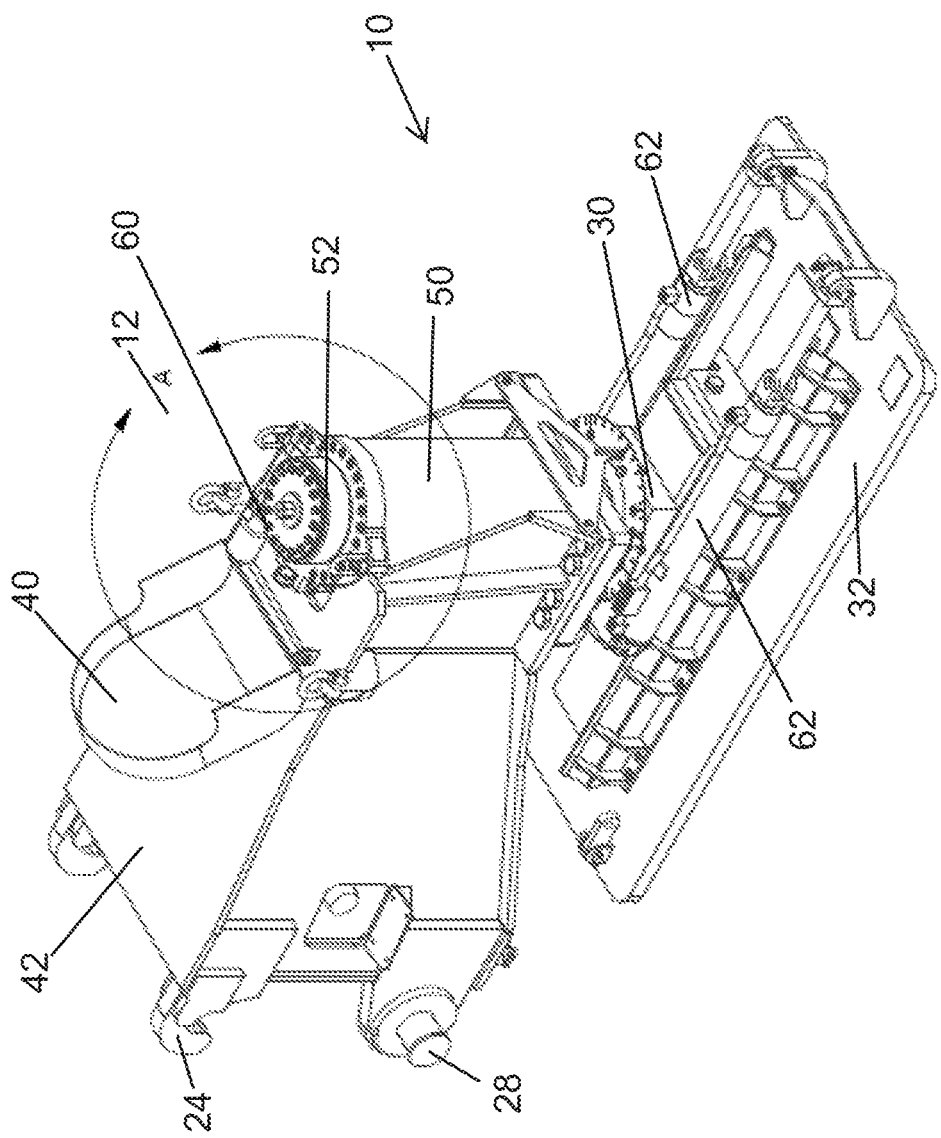
FIG. 11 illustrates a perspective view of the rig movement, rotation and alignment assembly shown in FIGS. 4 and 5 with a cover opened for ease of viewing.
Figure 12:
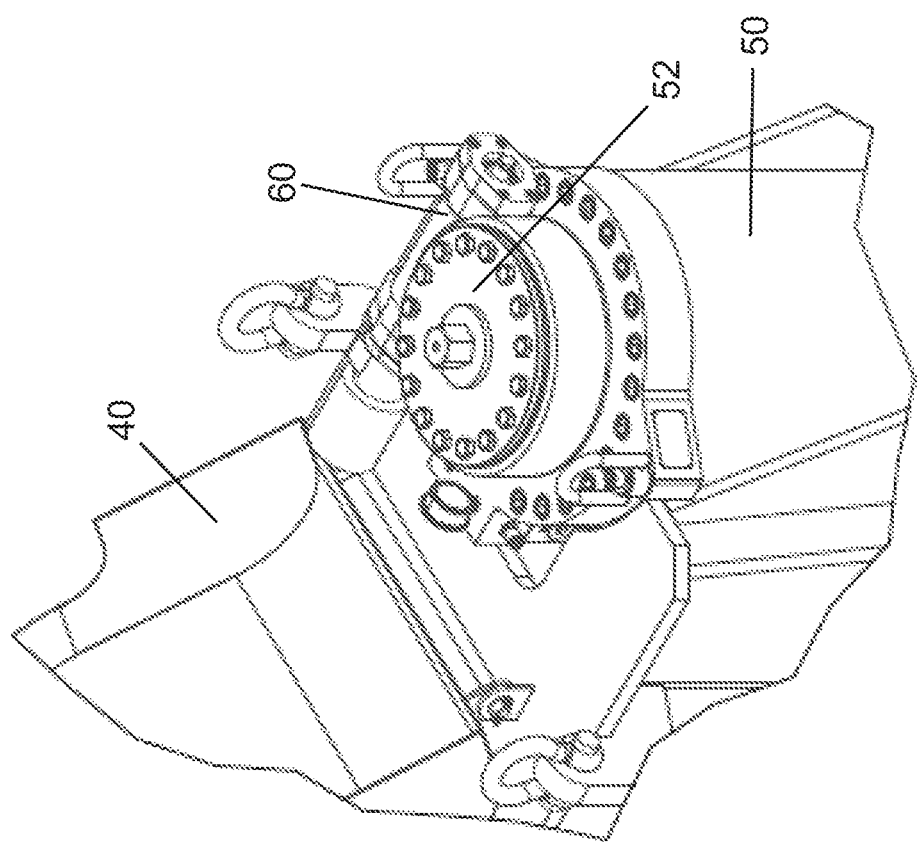
FIG. 12 illustrates an enlarged portion shown by arrows A in FIG. 11.

FIG. 11 illustrates a perspective view of the assembly 10 with a cap 40 which has been opened for visibility to illustrate the slew drive 60 configured to rotate the elongated rod 52 about its axis in relation to the lifting cylinder housing 50.

Figure 6:
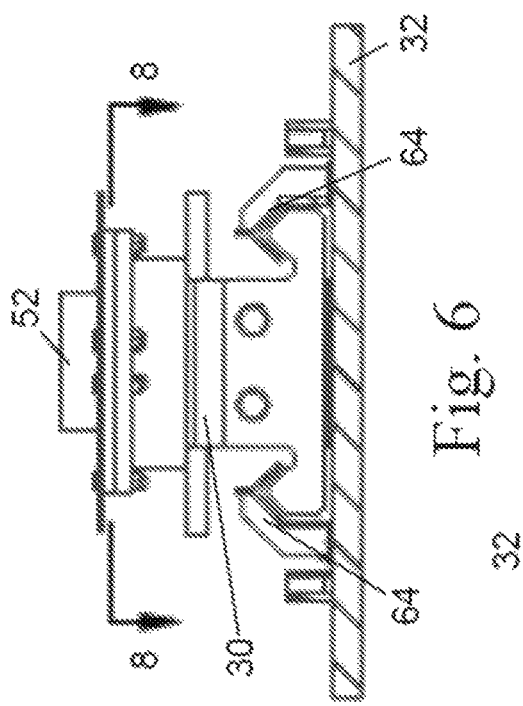
FIG. 6 illustrates a sectional view taken along section line 6-6 of FIG. 5.
Figure 8:
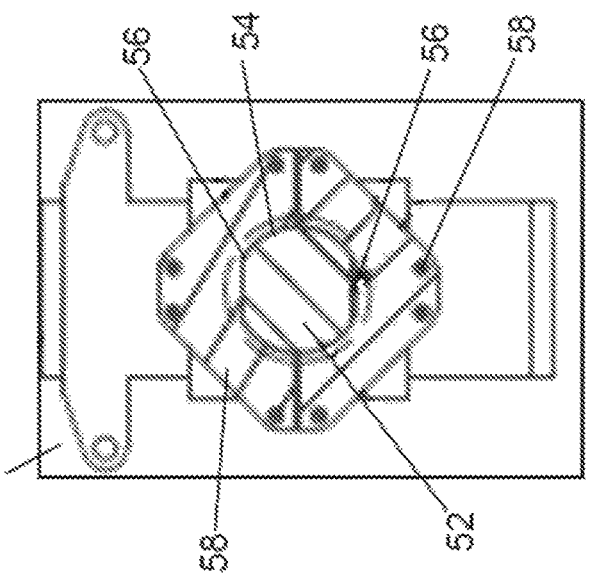
FIG. 8 illustrates a sectional view taken along section line 8-8 of FIG. 6.

FIG. 8 illustrates a sectional view taken along section line 8-8 of FIG. 6.

Figure 20:
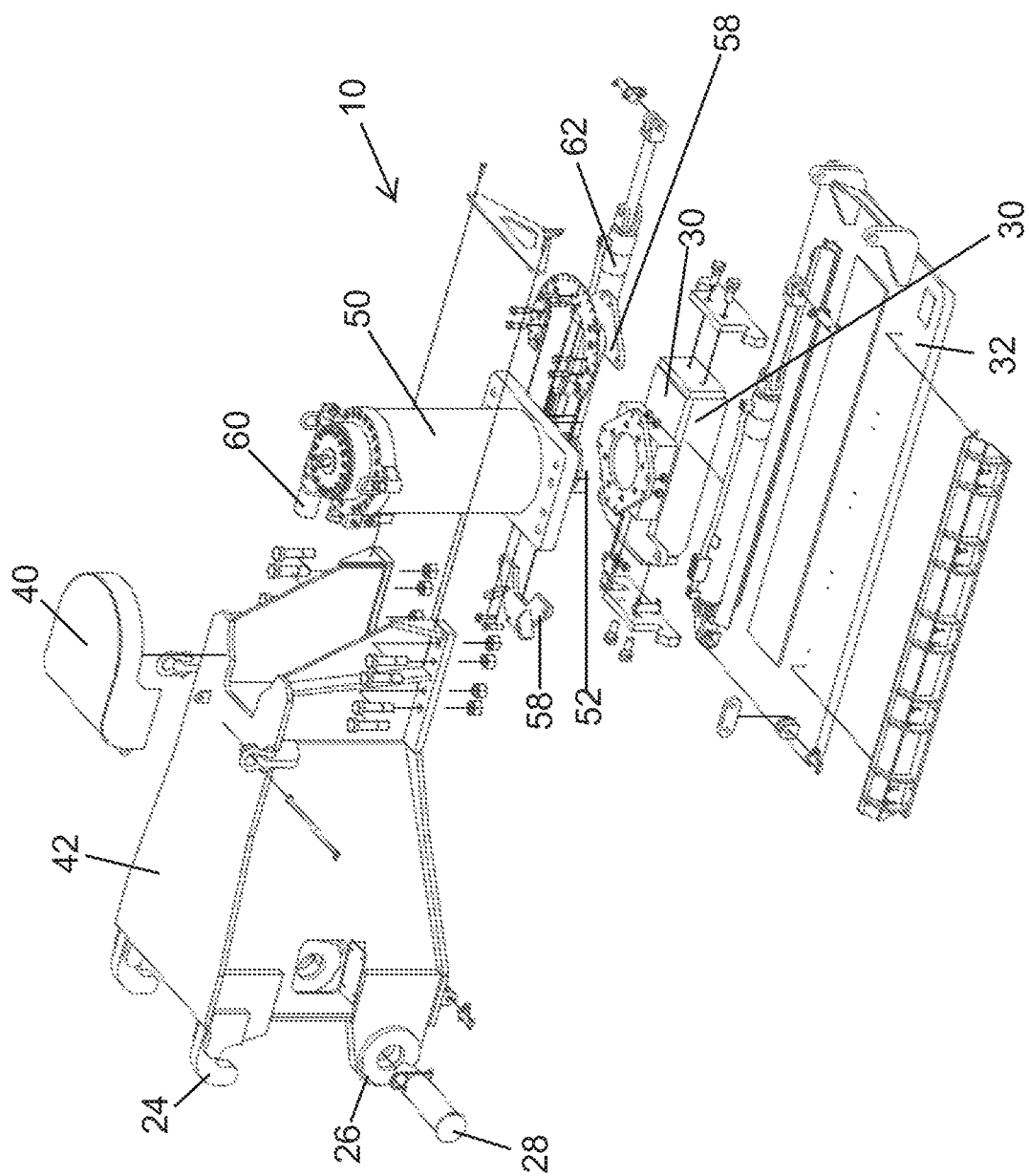
FIG. 20 illustrates an exploded view of the rig movement, rotation and alignment assembly.
Figure 21:
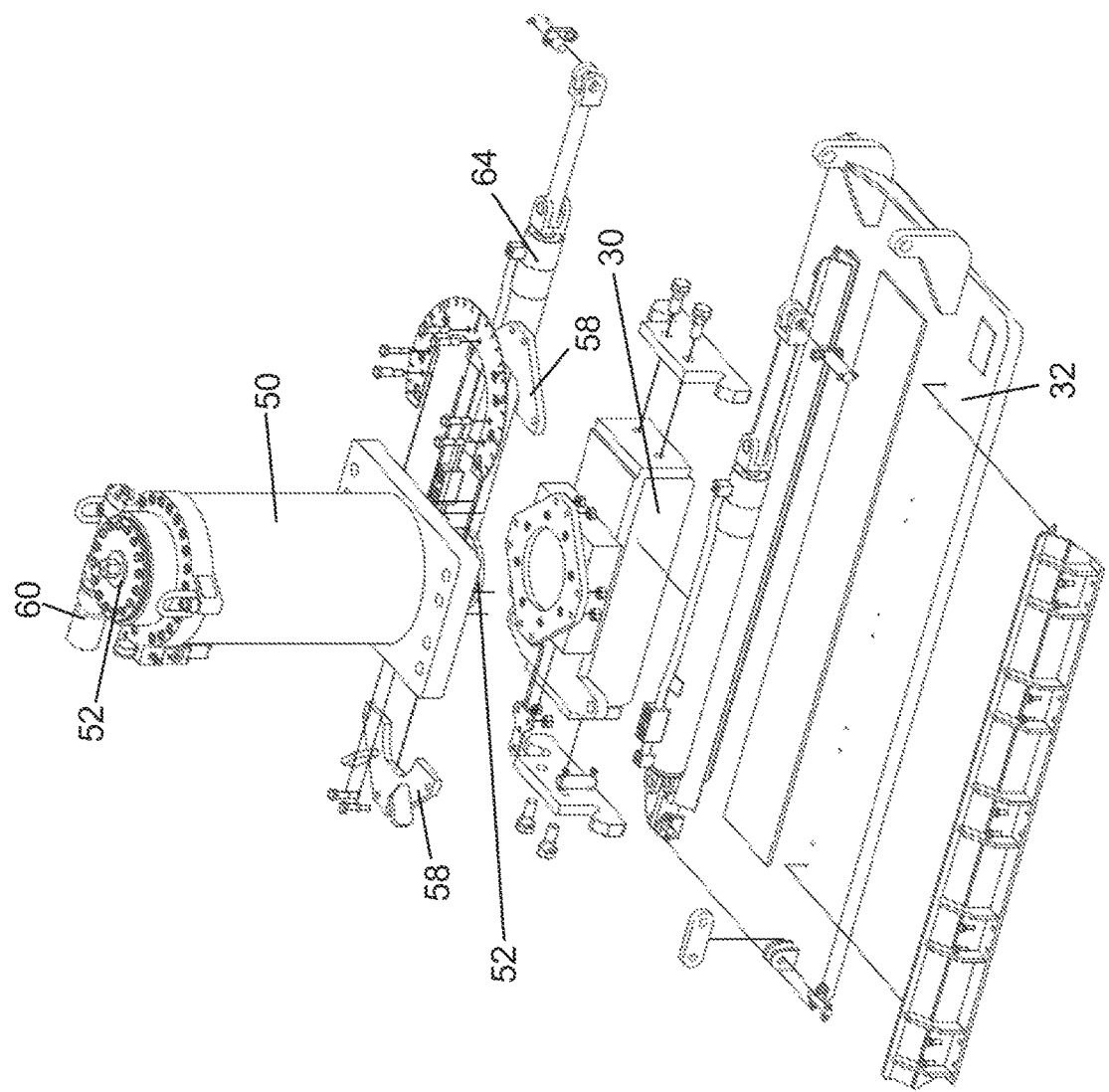
FIG. 21 illustrates an exploded view of one lifting jack assembly and bearing pad of the rig movement, rotation and alignment assembly.

FIG. 20 illustrates an exploded view of the rig movement, rotation and alignment assembly 10, while FIG. 21 illustrates an exploded view of the lifting jack assembly 12 and the bearing pad 32.

Each lifting assembly includes a rotation translation assembly. With continuing reference to FIG. 8 and with reference to FIGS. 20 and 21, near a lower end of each elongated rod 52 is a circumferential recess 54.

As best seen in FIG. 8, the circumferential recess 54 includes at least one flat segment. In a preferred embodiment, the circumferential recess includes a pair of opposed flat segments 56. A retainer plate comprising a pair of arcuate retainer plates 58 together surround the elongated rod 52 and reside in the circumferential recess 54. The arcuate retainer plates 58 also have flat segments which mate with the flat segments 56 in the circumferential recess 54 of the elongated rod. Accordingly, the retainer plates 58 trap the elongated rod 52. The retainer plates 58 are, in turn, secured to the roller assembly 30 which, in turn, is secured to the bearing pad 32.

The roller assembly 30 permits incremental movement of the cylinder and rod 52 with respect to the bearing pad 32 by a pair of parallel hydraulic skidding cylinders 62. When the bearing pad 32 is lowered on the ground, the skidding cylinders 62 are configured to move the entire rig substructure with respect to the bearing pad 32.

The elongated rod 52 is, thus, connected to the bearing pad 32 through the roller assembly. Accordingly, rotational movement of the rod 52 results in rotational movement of the roller assembly 30 and, in turn, the bearing pad 32.

FIG. 6 is a sectional view taken along section line 6-6 of FIG. 5. As seen in FIGS. 6 and 8, there is an inverted V-shaped track 64 between the bearing pad 32 and the roller assembly 30 above it which permits lateral realignment of each bearing pad.

Figure 13:
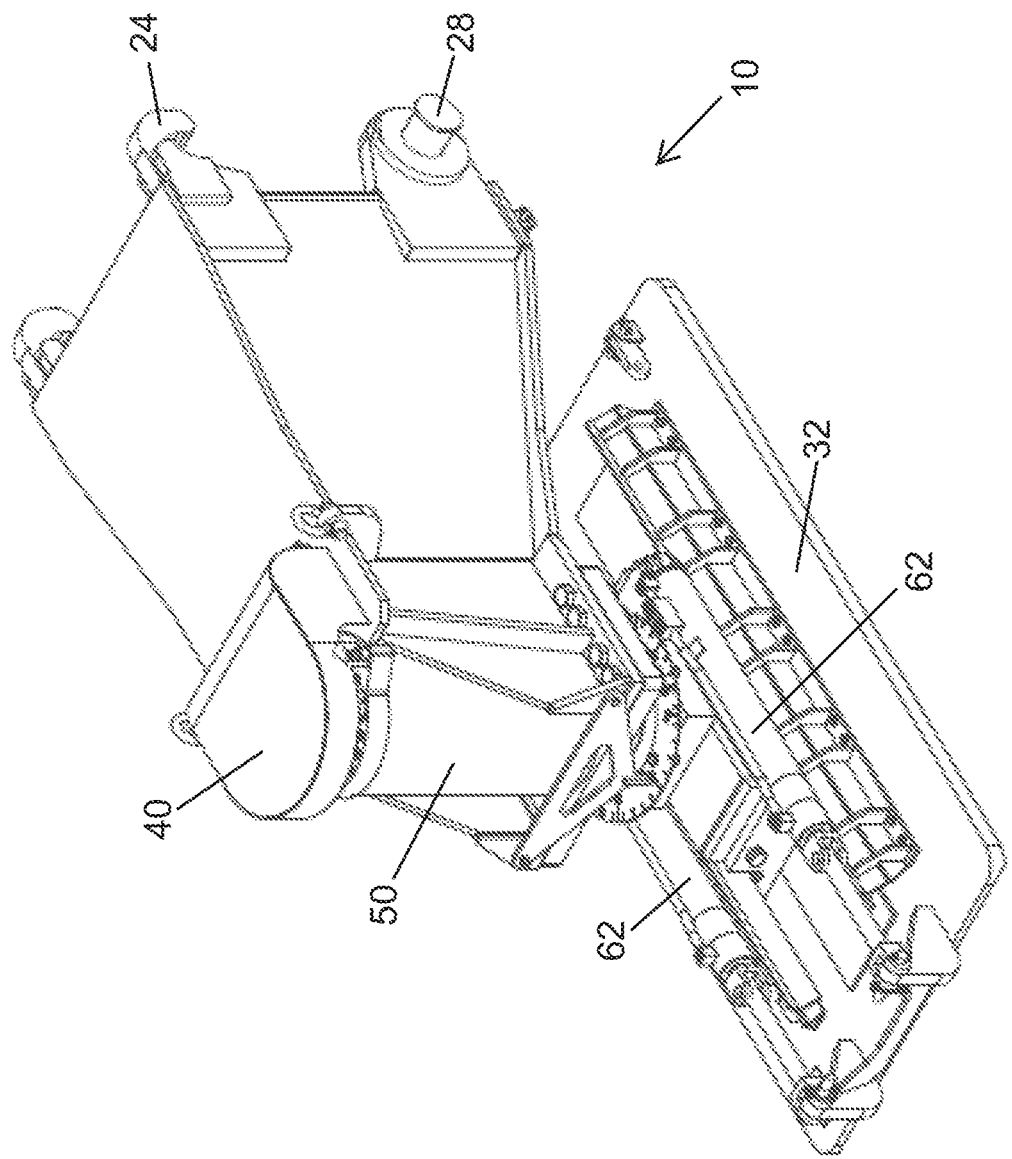
FIG. 13 illustrates an alternate perspective view of the rig movement, rotation and alignment assembly.
Figure 14:
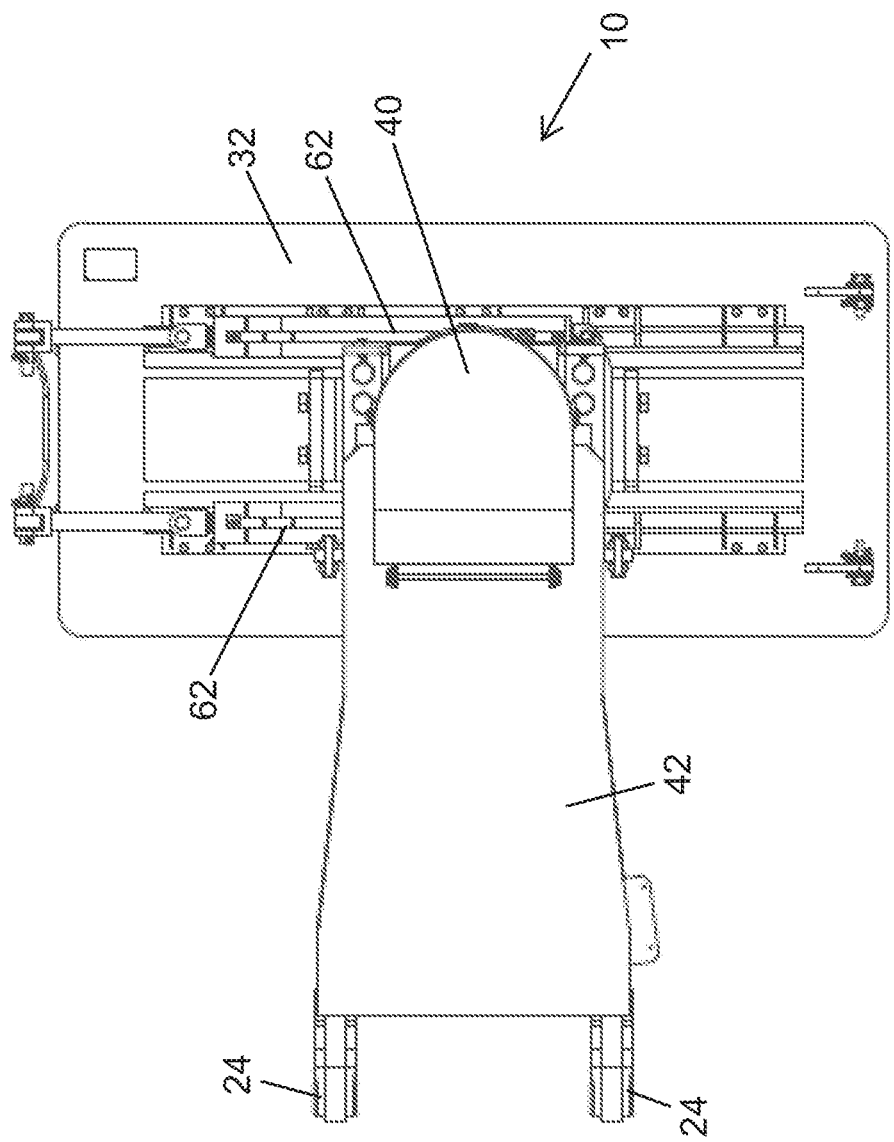
FIGS. 14, 15, and 16 illustrate alternate views of the rig movement, rotation and alignment assembly with the bearing pad rotated with respect to the cylinder housing and pod bracket to a position 90 degrees from the position shown in FIGS. 1 through 13.
Figure 15:
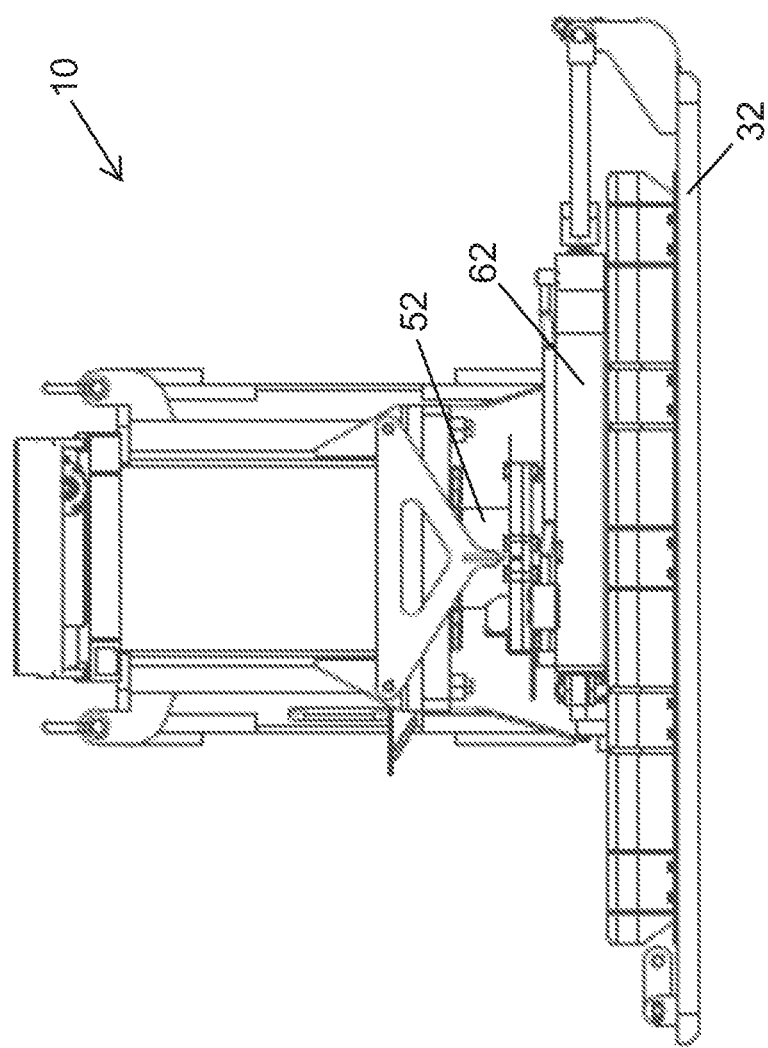
Figure 16:
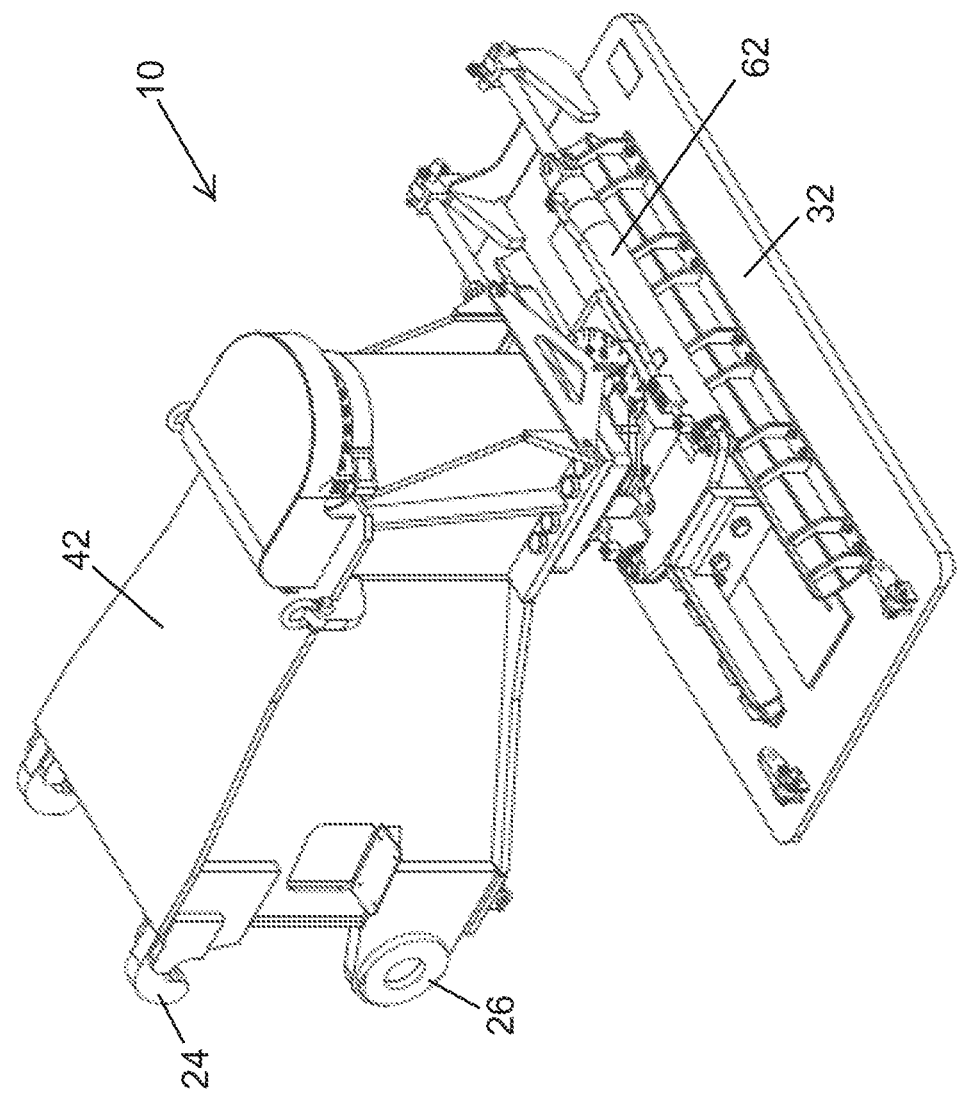

FIG. 13 illustrates a perspective view of the rig movement, rotation and alignment assembly 10 shown in FIGS. 1 through 12. FIGS. 14, 15, and 16 illustrate alternate views of the bearing pad 32 rotated in a position 90 degrees from the position of the bearing pad 32 shown in FIGS. 1 through 13.

Figure 17:
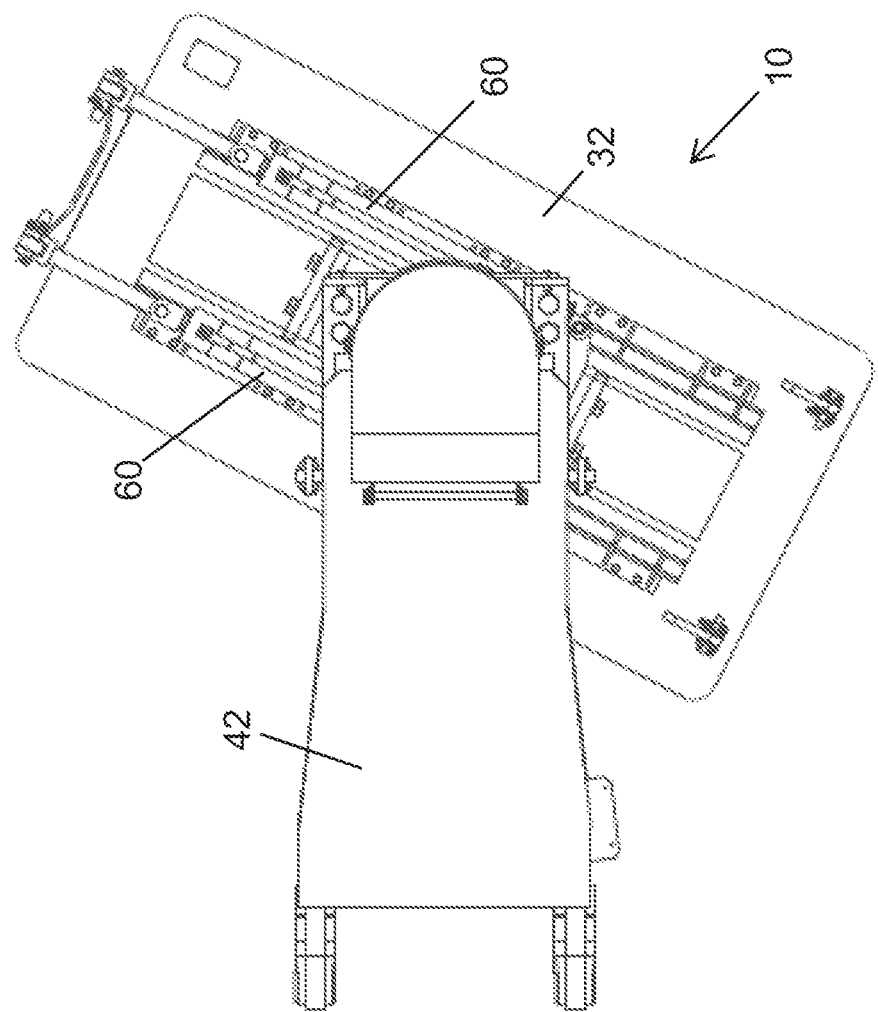
FIGS. 17, 18, and 19 illustrate top, side and perspective views of the rig movement, rotation and alignment assembly with the bearing pad rotated to a different rotational orientation with respect to the cylinder housing and pod bracket from that shown in FIGS. 1 through 16.
Figure 18:
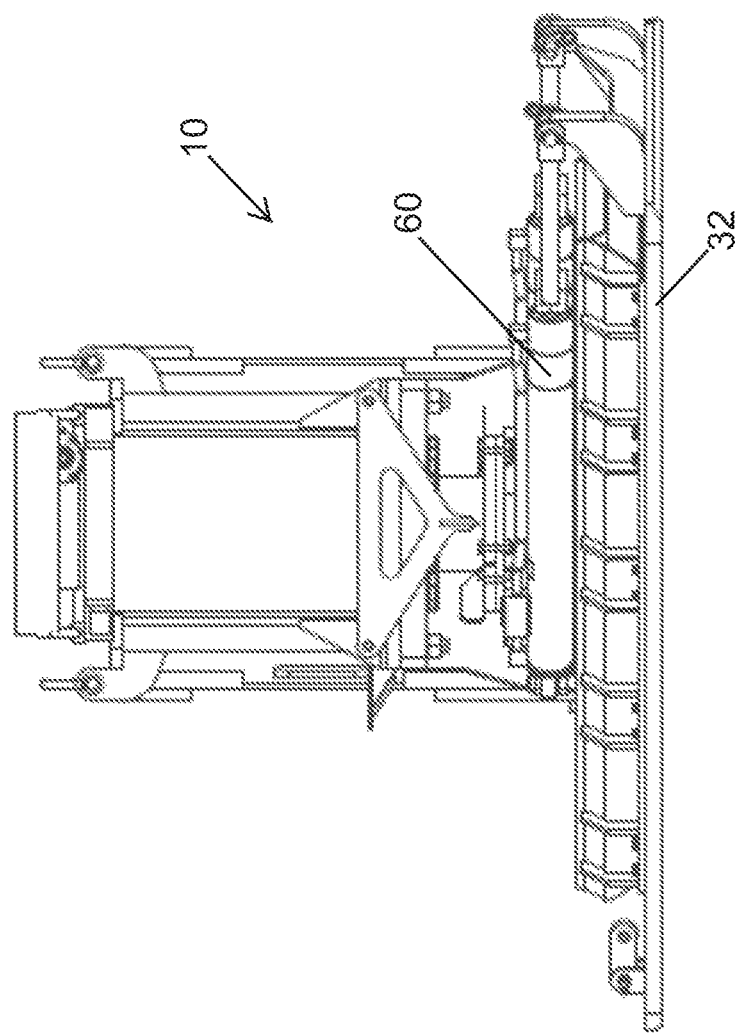
Figure 19:
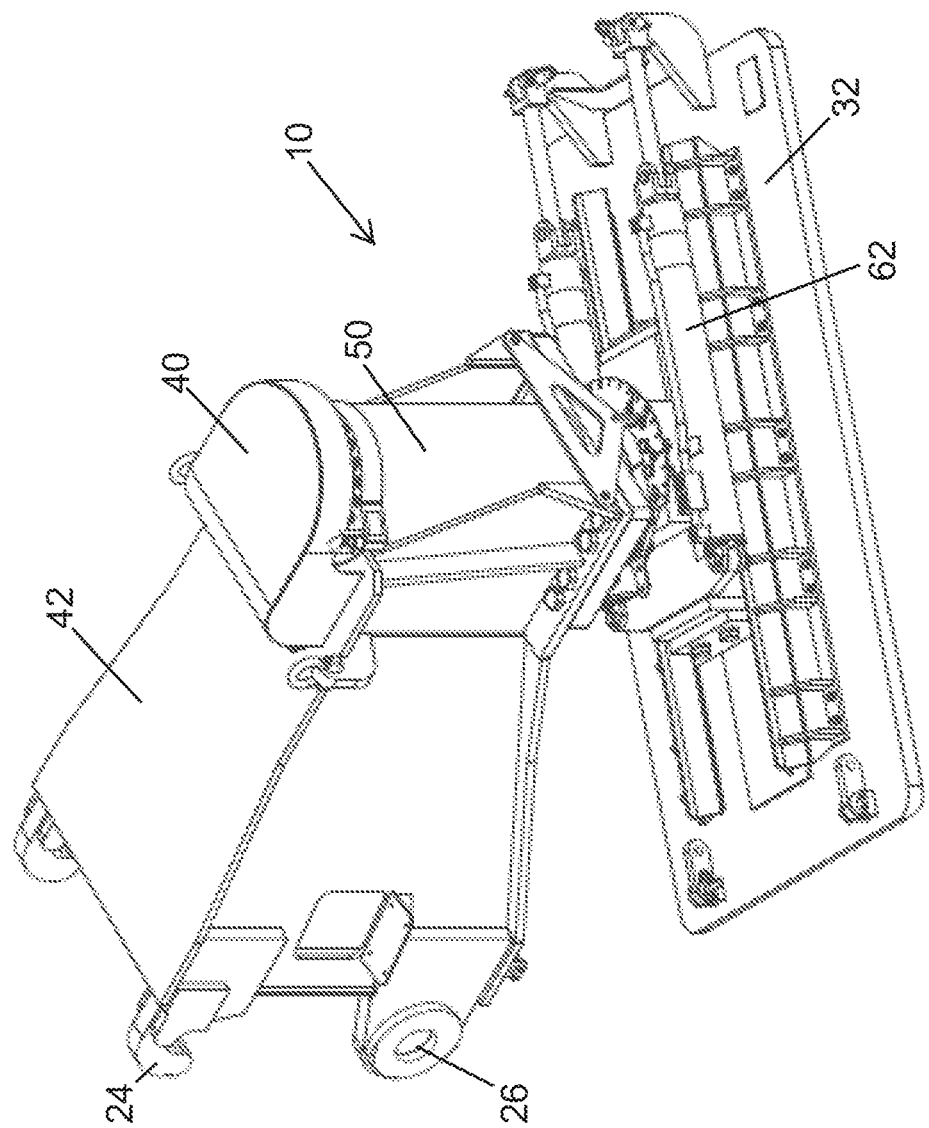

FIGS. 17, 18, and 19 illustrate the bearing pad 32 rotated to a different rotational orientation with respect to the cylinder housing 50 and pod bracket 42 shown in FIGS. 1 through 16.

While the foregoing describes operation of one lifting jack assembly, the others operate in similar fashion.

The present invention thus provides direct transfer of rotational movement of the elongated rod of the hydraulic cylinder housing to the bearing pad without complicated linkage or other mechanisms. At the same time, the bearing pad is incrementally movable with respect to the hydraulic lifting cylinder and elongated rod.

Whereas, the invention has been described in relation to the drawings attached hereto, it should be understood that other and further modifications, apart from those shown or suggested herein, may be made within the scope of this invention.

What is claimed is:

1. A rig movement, rotation and alignment assembly, which assembly comprises:
   a plurality of lifting jack assemblies, each of said lifting jack assemblies attached to a rig substructure and attached to respective bearing pads;
   each of said lifting jack assemblies having a cylinder housing and an elongated rod movable axially within each said cylinder housing;
   each said elongated rod engaged with a respective rod rotation drive assembly in order to rotate each said elongated rod with respect to each said cylinder housing; and
   a rotation translation assembly to translate rotational movement of each said elongated rod into rotational movement of each said respective bearing pad;
   wherein each said lifting jack assembly is connected to said rig substructure by respective pod brackets and each said respective pod bracket detachably connects to the substructure with a pair of hooks and a pair of eyes and wherein said eyes receive pins which pass through openings in the substructure to detachably secure each said respective pod bracket to said substructure.

2. The rig movement, rotation and alignment assembly as set forth in
   claim 1 wherein each said respective rod rotation drive assembly is a slew drive.

3. The rig movement, rotation and alignment assembly as set forth in claim 1 wherein said rotation translation assembly includes:
   a circumferential recess in each said elongated rod, wherein each said circumferential recess includes at least one flat segment;
   a retainer plate attached to each said respective bearing pad, each said retainer plate received in and engaged with each said circumferential recess and each said flat segment, so that rotation of each said elongated rod results in rotation of each said respective bearing pad.

4. The rig movement, rotation and alignment assembly as set forth in claim 3 wherein each said at least one flat segment in each said circumferential recess comprises a pair of opposed flat segments.

5. The rig movement, rotation and alignment assembly as set forth in claim 4 wherein each said retainer plate comprises a pair of arcuate retainer plates which together surround each said elongated rod.

6. The rig movement, rotation and alignment assembly as set forth in claim 1 wherein a roller assembly is juxtaposed between a lower end of each said lifting jack assembly and each said respective bearing pad.

7. The rig movement, rotation and alignment assembly as set forth in claim 6 wherein a lower end of each of said rod terminates in a convex end which is retained in a mating top of said roller assembly.

8. The rig movement, rotation and alignment assembly as set forth in claim 1 wherein said plurality of lifting jack assemblies comprises four lifting jack assemblies, each of said lifting jack assemblies parallel to and spaced from each other.

9. The rig movement, rotation and alignment assembly as set forth in claim 1 wherein each said elongated rod is movable axially within each said cylinder housing by a hydraulic system.

10. The rig movement, rotation and alignment assembly as set forth in claim 1 wherein each of said plurality of lifting jack assemblies operates independently of each other of said plurality of lifting jack assemblies.

\* \* \* \* \*